Jan. 27, 1959   L. FARNSWORTH   2,871,022
INDEXABLE COLLET CHUCK APPARATUS
Original Filed Sept. 19, 1956

INVENTOR.
LAWRENCE FARNSWORTH
BY
James E. Nilles
ATTORNEY.

United States Patent Office 2,871,022
Patented Jan. 27, 1959

2,871,022

INDEXABLE COLLET CHUCK APPARATUS

Lawrence Farnsworth, Racine, Wis., assignor of fifty percent to Max M. Seft, Racine, Wis.

Original application September 19, 1956, Serial No. 610,741. Divided and this application May 13, 1957, Serial No. 658,611

2 Claims. (Cl. 279—5)

This invention relates in general to workpiece holding apparatus and in particular to an indexing collet chuck.

An object of the invention is to provide an improved non-rotating chuck which can be quickly and easily adjusted to accommodate workpieces of various diameters and which are rotatably driven within the chuck, without disturbing the other settings of its associated parts.

Another object of the invention is to provide an indexable chuck for holding a rotatably driven workpiece, which chuck can readily be adjusted to accommodate workpieces of various sizes and yet maintain the chuck operating handle in a proper operating position.

Other objects and advantages of this invention will become more apparent from the following detailed description and attached drawings wherein a form of the invention is illustrated.

Figures 1, 2:
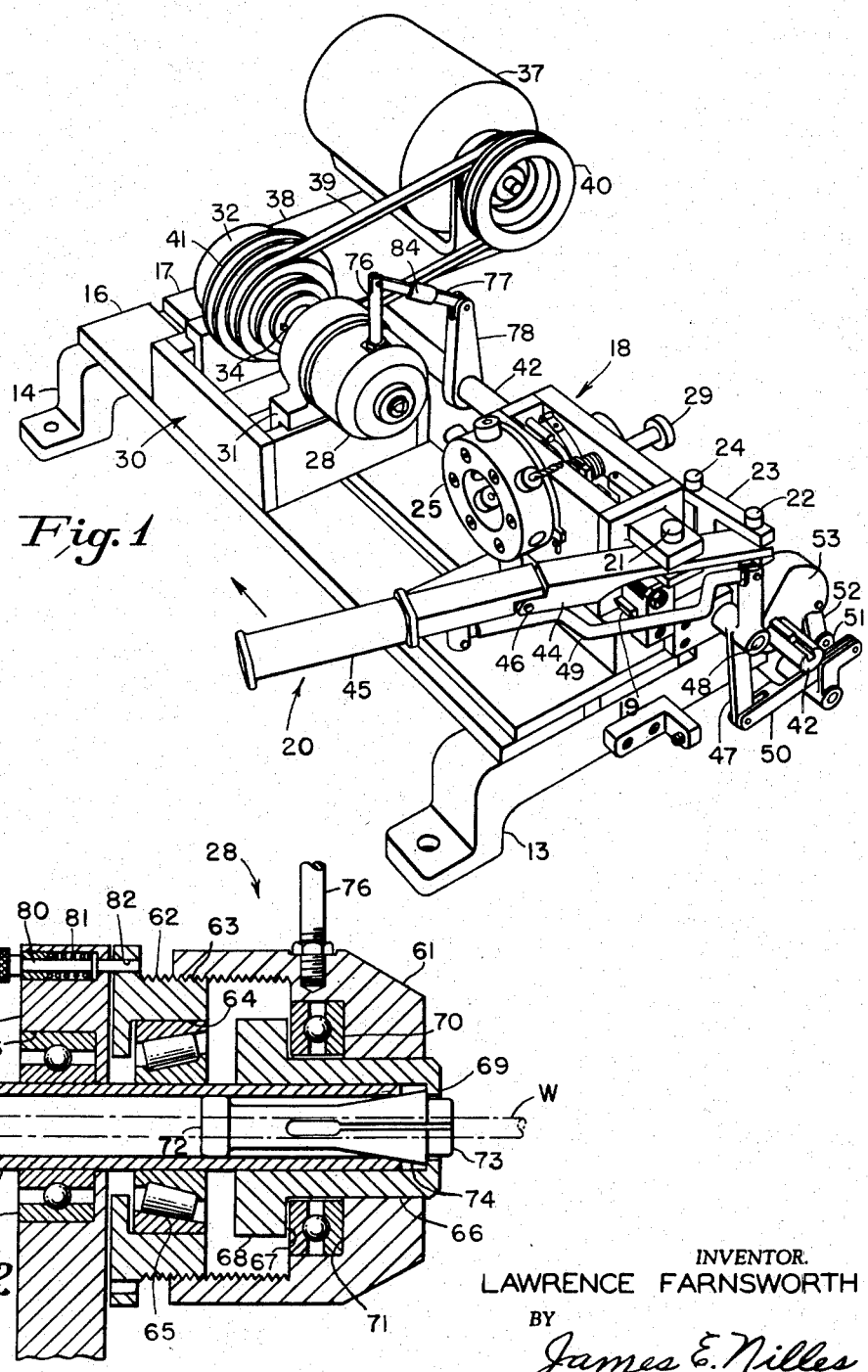
Figure 1 is a perspective view of a machine embodying the invention, the view being taken generally from the front, right, upper side.
Figure 2 is a front, elevational, sectional view of the improved driving chuck shown in Figure 1, but on an enlarged scale.

Referring in greater detail to the drawings, the machine chosen for purposes of illustrating the invention is a turret lathe. This machine is more fully described in my co-pending U. S. application Serial No. 610,741, filed September 19, 1956, entitled, "Turret Lathe," of which this application is a division. For purposes of the present invention a brief description of the machine in general will be made for the sake of orientation, and for a more complete description of the machine, if deemed desirable, reference may be had to said application.

The machine has a stationary support structure including two transversely positioned leg members 13, 14 rigidly connected together by two horizontal bed plates 16, 17. A turret housing 18 is slidably mounted on the V-shaped way 19 which is rigidly secured to plate 16, 17. A control handle 20 is pivoted at 21 to the housing and at 22 to a link 23. The link in turn is pivotally connected at 24 to the stationary support structure. By swinging the handle in a horizontal direction about pivot point 22, the housing and its associated turret 25 is caused to slide over the V-way 19 toward and away from the workpiece holding chuck 28. The turret 25 is rotatably mounted on the housing and carries a plurality of tools around its periphery. A locking pin 29 is slidably mounted on the housing and acts to lock the turret in any one of its positions. This particular machine is one designed for secondary operations, such as centering and/or drilling the ends of rotating cylindrical workpieces W which are held by the stationary chuck 28.

A drive supporting box 30 is rigidly secured to the plates 16, 17 generally at the left end of the machine, as viewed from the front. Bearing blocks 31, 32 are rigidly secured to box 30 in any suitable manner, or may be integrally formed therewith as by a single piece casting. The bearing blocks 31, 32 thus form a part of the support structure.

A tubular drive shaft 34 is rotatably mounted on the support structure and serves to furnish a drive to the workpiece W mounted within. This shaft also forms a support for the rotatable parts of the chuck with which it is in driving engagement, as will appear. The shaft is mounted in the blocks 31, 32 which each have an anti-friction bearing 35 (only one shown) press-fitted into a counter-bore 36. An electric motor 37 is mounted on the plate 38 of the support structure and rotatably drives the shaft 34 through a flexible belt 39 trained over step-cone pulleys 40, 41 of the motor and shaft 34 respectively.

A main actuating member 42 is provided for operating various parts of the machine such as the locking pin 29 and the chuck 28 to be described later. This member takes the form of a shaft which is oscillatingly mounted in the rear portion of legs 13, 14, and is activated by the control handle 20 as follows. The handle 20 is comprised of two sections 44, 45 which are pivotally connected together about a generally horizontal axis by pin 46. This compound control handle is more fully described in my U. S. Reissue Patent No. 24,289, issued March 19, 1957 and a brief description here is thought to be sufficient for purposes of this disclosure. The actuating portion 45 of the handle swings in a vertical direction about its pivot 46. A lever 47 is pivoted intermediate its length at 48 to the support structure and is pivotally connected at its upper end to the handle portion 45 by means of the connecting link 49. The lower end of lever 47 is pivotally connected by link 50 to an over-center linkage 51, 52, 53. This over-center linkage serves to lock the handle portion 45 in the operating position (Fig. 1) and the entire handle 20 can then be swung as a rigid unit in a horizontal plane about pivot 22 to slide the turret housing. When the handle portion 45 is swung downwardly about its pivot 46, the linkage just described serves to oscillate shaft 42 to unlock the turret and also to unlock the holding chuck, as will appear more fully hereinafter.

In accordance with the present invention, a novel workpiece holding chuck is provided for rotatably supporting a workpiece of any length and which will accommodate pieces of various diameters while at the same time permits the chuck operating lever to be positioned in a convenient position. If the chuck is to be opened and closed by the compound control handle 20 it is unnecessary to readjust the connecting linkage to any appreciable extent in order to accommodate various diameter workpieces. The outer portion of the chuck remains stationary while the driveshaft and workpiece are rotatably driven within the chuck.

The chuck 28 includes a nose portion 61 and a rear index portion 62 threadably engaged therewith as at 63. The drive shaft 34 is rotatably mounted in a counter-bore 64 of the index portion by means of the anti-friction tapered roller bearing assembly 65. A sleeve 66 is mounted on shaft 34 for slight axial movement relative thereto and has a thrust surface 67 formed by flange 68 at one of its ends. At its other end is an inwardly extending radial flange 69. An anti-friction bearing assembly 70 is interposed between surface 67 and the shoulder 71 of nose portion 61 so as to permit the outer nose portion of the chuck to remain stationary while the sleeve 66 rotates with the shaft.

A conventional collet 72 is located within shaft 34 and its spring jaws 73 are engageable by flange 69, when the nose portion is moved to the left (Fig. 2), to force the inclined surfaces 74 against the end of the shaft, causing them to contract about the workpiece W.

Only a small amount of relative movement between the nose and index portions is required to cause the collet to drivingly embrace the workpiece or release it completely. This movement is provided by the manually operated lever or post 76 which is threaded into the upper part of the nose portion and extends upwardly therefrom. If it is desired to operate the lever 76 from the compound control handle 20, rather than separately by the left hand of the operator, an adjustable link 77 is pivotally attached at one end to the upper end of the lever. The other end of the link 77 is pivotally attached to an upstanding arm 78 which is secured at its lower end to the actuating shaft 42 for oscillation therewith.

In the position shown in Figure 1, with the control handle portion 45 raised, the shaft 42 has been oscillated to cause the upper end of arm 78 to move forwardly, carrying with it the lever 76. This movement has caused the nose portion 61 to move to the left (as viewed in Fig. 2) by being screwed further onto the threads of the index member 62. This movement has shifted the sleeve 66 and collet 72 to the left, causing the latter to clamp around the workpiece.

When the handle portion 45 is dropped, that is, swung downwardly about its pivot 46, the shaft 42 is oscillated in the opposite direction, causing the lever 76 to swing rearwardly, thus permitting the spring jaws of the collet to expand, freeing the workpiece.

Various diameters of bar stock are used in a machine such as this and it is desirable to be able to quickly and easily insert these pieces in the chuck and still have the lever 76 remain in the upright position where it can be grasped by the operator; or, if the connection with the control handle 20 is utilized, without appreciably disturbing the linkage connected thereto. For this purpose a pin 80 is slidably mounted in the upper portion of bearing block support 31 and is resiliently urged by spring 81 into engagement with any one of a plurality of apertures 82 circumferentially spaced around the index portion 62, thus locking it to support 31. By withdrawing the pin by its knurled end 83 from aperture 82, the periphery of the index portion can be grasped by the operator and rotated in either direction to cause the nose portion to move axially, thus varying the diametrical opening of the collet accommodate various diameter pieces of stock. By this convenient and quick acting interengaging locking means between the chuck and support, the lever 76 is always located on the top side of the stationary chuck, regardless of workpiece diameter. If the control handle linkage is used to operate the chuck, small final adjustments can be made quickly by the turnbuckle 84 in link 77 which adjusts the length thereof.

It should be understood that it is not intended to limit the invention to the above described forms and details, and that the invention includes such other forms and modifications as are embraced by the scope of the appended claims.

I claim:

1. An indexable collet chuck assembly adapted to be supported by a support structure, said assembly including, a tubular drive shaft adapted to be rotatably and drivingly mounted in said structure, a collet mounted in said shaft adjacent the end of the latter, said collet having spring jaws engageable with said shaft end, a sleeve mounted over said shaft for limited sliding relative thereto, said sleeve having a portion adapted to bear against said jaws to force the latter against said shaft end to a jaw closing position, a nose portion mounted on said sleeve, said sleeve having an axial thrust absorbing surface, an anti-friction bearing between said surface and said nose portion whereby said sleeve and collet are rotatably driven with said shaft while said nose portion remains stationary, an index portion having an exposed peripheral portion for manual rotation thereof independently of said nose portion, said index portion being rotatably mounted relative to said shaft and threadably engaged with said nose portion for moving the latter in an axial direction when said index portion is rotated, said index portion including a plurality of circumferentially spaced and axially extending apertures, a locking pin slidably mounted in said support structure for movement in an axial direction between index portion locked and unlocked positions, and a spring for urging said pin to said locked position.

2. An indexable collet chuck assembly including, a tubular drive shaft adapted to be rotatably and drivingly mounted on a support structure, a collet mounted in said shaft adjacent the end of the latter and having spring jaws engageable with said shaft end, a sleeve mounted over said shaft for limited sliding relative thereto, said sleeve having a portion adapted to bear against said jaws to force the latter against said shaft end to a jaw closing position, a nose portion mounted on said sleeve, said sleeve having an axial thrust absorbing surface, an anti-friction bearing between said surface and said nose portion whereby said sleeve and collet are rotatably driven with said shaft while said nose portion remains stationary, an index portion having an exposed peripheral portion for manual rotation thereof independently of said nose portion, said index portion being rotatably mounted relative to said shaft and threadably engaged with said nose portion for moving the latter in an axial direction when said index portion is rotated, and releasable locking means between said support structure and said index portion for locking the latter in one of a plurality of positions relative to said structure.

References Cited in the file of this patent
UNITED STATES PATENTS

| | | |
|---|---|---|
| 2,345,069 | Phillips | Mar. 28, 1944 |
| 2,429,617 | Gustafson | Oct. 28, 1947 |
| 2,440,926 | Bogart | May 4, 1948 |